(12) United States Patent
Beuterbaugh et al.

(10) Patent No.: US 9,556,377 B2
(45) Date of Patent: Jan. 31, 2017

(54) TREATMENT FLUIDS CONTAINING A HYDROPHOBICALLY MODIFIED CHELATING AGENT AND METHODS FOR USE THEREOF

(71) Applicant: Halliburton Energy Services, Inc., Houston, TX (US)

(72) Inventors: Aaron Michael Beuterbaugh, Spring, TX (US); Enrique Antonio Reyes, Tomball, TX (US); Alyssa Lynn Smith, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 316 days.

(21) Appl. No.: 14/379,045

(22) PCT Filed: Oct. 8, 2013

(86) PCT No.: PCT/US2013/063860
§ 371 (c)(1),
(2) Date: Aug. 15, 2014

(87) PCT Pub. No.: WO2015/053752
PCT Pub. Date: Apr. 16, 2015

(65) Prior Publication Data
US 2016/0244660 A1 Aug. 25, 2016

(51) Int. Cl.
*C09K 8/74* (2006.01)
*E21B 43/25* (2006.01)
(Continued)

(52) U.S. Cl.
CPC ............... *C09K 8/74* (2013.01); *C09K 8/035* (2013.01); *C09K 8/64* (2013.01); *C09K 8/68* (2013.01);
(Continued)

(58) Field of Classification Search
CPC ............ C09K 8/74; E21B 43/25; E21B 43/26; E21B 37/00
See application file for complete search history.

(56) References Cited

U.S. PATENT DOCUMENTS

| 131,022 A | 9/1872 | Mowry |
|---|---|---|
| 224,346 A | 2/1880 | McDonald |
| (Continued) | | |

FOREIGN PATENT DOCUMENTS

WO WO2006/054261 5/2006

OTHER PUBLICATIONS

International Search Report and Written Opinion for PCT/US2013/063860 dated Jul. 24, 2014.

*Primary Examiner* — Zakiya W Bates
*Assistant Examiner* — Crystal J Miller
(74) *Attorney, Agent, or Firm* — McDermott Will & Emery LLP; Craig Roddy

(57) ABSTRACT

Chelating agents are often used in conjunction with stimulation operations in a subterranean formation to address the presence of certain metal ions therein. Hydrophobically modified chelating agents can be used to form metal-ligand complexes in a subterranean formation that can sometimes exhibit significantly different behavior than do their more water-soluble variants. Methods for treating a subterranean formation can comprise: providing a treatment fluid comprising a hydrophobically modified aminopolycarboxylic acid chelating agent, the chelating agent comprising an N-substitution having no carboxylic acid groups and about 6 carbon atoms or more; introducing the treatment fluid into a subterranean formation; and complexing metal ions in the subterranean formation with the chelating agent to form a metal-ligand complex.

24 Claims, 1 Drawing Sheet

(51) Int. Cl.
*C09K 8/68* (2006.01)
*C09K 8/035* (2006.01)
*C09K 8/64* (2006.01)
*C09K 8/72* (2006.01)
*C09K 8/82* (2006.01)
*C09K 8/86* (2006.01)
*E21B 43/26* (2006.01)
*E21B 37/00* (2006.01)

(52) U.S. Cl.
CPC . *C09K 8/72* (2013.01); *C09K 8/82* (2013.01); *C09K 8/86* (2013.01); *E21B 43/25* (2013.01); *E21B 43/26* (2013.01); *E21B 37/00* (2013.01)

(56) References Cited

U.S. PATENT DOCUMENTS

| | | |
|---|---|---|
| 4,036,300 A | 7/1977 | Holm et al. |
| 4,489,042 A | 12/1984 | Savins et al. |
| 4,888,121 A | 12/1989 | Dill et al. |
| 6,911,418 B2 | 6/2005 | Frenier |
| 2006/0289162 A1 | 12/2006 | Santra et al. |
| 2008/0139412 A1* | 6/2008 | Fuller ............ C09K 8/52 507/219 |
| 2011/0120712 A1* | 5/2011 | Todd ............ C04B 28/02 166/280.1 |
| 2012/0000652 A1 | 1/2012 | Jones et al. |
| 2012/0097392 A1 | 4/2012 | Reyes et al. |
| 2012/0115759 A1* | 5/2012 | Reyes ............ C09K 8/524 507/241 |
| 2013/0000370 A1* | 1/2013 | Lang ............ C05D 9/02 71/23 |
| 2014/0235521 A1* | 8/2014 | Silvernail ........ C11D 3/044 510/161 |
| 2015/0211345 A1* | 7/2015 | Reyes ............ E21B 43/25 166/300 |

\* cited by examiner

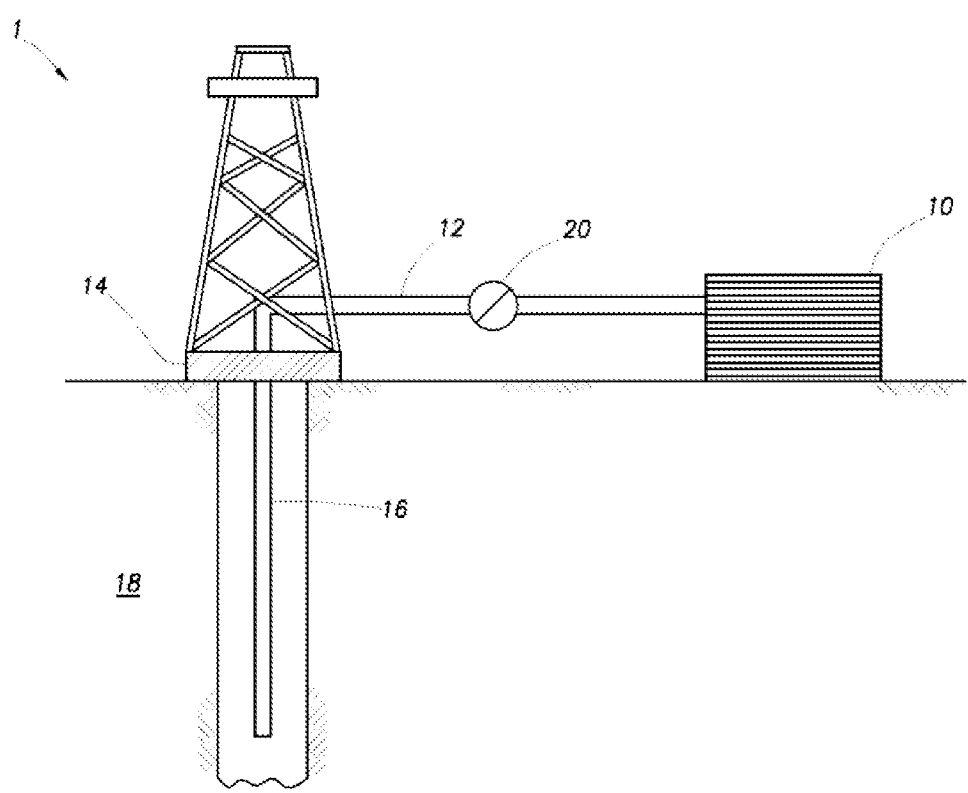

TREATMENT FLUIDS CONTAINING A HYDROPHOBICALLY MODIFIED CHELATING AGENT AND METHODS FOR USE THEREOF

BACKGROUND

The present disclosure generally relates to stimulation of subterranean formations, and, more specifically, to methods for complexing metal ions in a subterranean formation with a hydrophobically modified chelating agent to decrease the occurrence of precipitation in the subterranean formation.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include drilling operations, fracturing operations, gravel packing operations, acidizing operations, scale dissolution and removal operations, sand control operations, consolidation operations, and the like.

Downhole acidizing operations and other dissolution operations may be used to stimulate a subterranean formation to increase production of a hydrocarbon resource therefrom. During an acidizing operation or a like dissolution operation, an acid-soluble material in the subterranean formation may be dissolved by one or more acids to expand existing flow pathways in the subterranean formation, to create new flow pathways in the subterranean formation, and/or to remove acid-soluble precipitation damage in the subterranean formation, thereby stimulating the formation's production capabilities. Introduction of an acidizing fluid to a subterranean formation may take place at matrix flow rates without fracturing of the formation matrix or at higher injection rates and pressures to fracture the formation. The acid-soluble material being dissolved by the acid(s) may be part of or formed from the native formation matrix or have been deliberately introduced into the subterranean formation in conjunction with a treatment operation (e.g., bridging agents, proppants, or gravel particulates). Illustrative substances within the native formation matrix that may be dissolved by an acid include, but are not limited to, carbonates, silicates and aluminosilicates, which may be present alone or in combination with one another in formations of mixed mineralogy. Other substances may also be dissolved during the course of performing an acidizing operation, and the foregoing substances should not be considered to limit the scope of substances that may undergo acidization.

Carbonate formations can contain minerals that comprise a carbonate anion (e.g., calcite (calcium carbonate), dolomite (calcium magnesium carbonate), and siderite (iron carbonate)). When acidizing a carbonate formation, the acidity of the treatment fluid alone may often be sufficient to solubilize the carbonate material by decomposing the carbonate anion to carbon dioxide and leeching a metal ion into the treatment fluid. Both mineral acids (e.g., hydrochloric acid) and organic acids (e.g., acetic and formic acids) may be used to treat a carbonate formation, often with similar degrees of success. Since it is relatively inexpensive, hydrochloric acid is very commonly used, typically in concentrations up to about 28% by volume. Other mineral and organic acids may be used as well.

Siliceous formations can include minerals such as, for example, zeolites, clays, and feldspars. As used herein, the term "siliceous" refers to a substance having the characteristics of silica, including silicates and/or aluminosilicates. The acids that can be effective for acidizing carbonate materials may have little effect on siliceous materials. Hydrofluoric acid, however, can react very readily with siliceous materials to promote their dissolution. Oftentimes, a secondary mineral acid or an organic acid can be used in conjunction with hydrofluoric acid to maintain a low pH state as the hydrofluoric acid becomes spent during dissolution of a siliceous material, where the low pH state helps promote continued solubilization of the siliceous material. Many types of siliceous formations can also contain varying amounts of carbonate materials. Most sandstone formations, for example, contain about 40% to about 98% sand quartz particles (i.e., silica), bonded together by various amounts of cementing materials, which may be siliceous in nature (e.g., aluminosilicates or other silicates) or non-siliceous in nature (e.g., carbonates, such as calcite). When siliceous materials are co-present with carbonate materials, significant precipitation issues can sometimes be encountered, as discussed below.

In some instances, it can be desirable to remove a carbonate material from a siliceous formation prior to acidizing the siliceous material therein to decrease the occurrence of precipitation in the subterranean formation. For example, calcium ions liberated from the carbonate material can react readily with fluoride ions from hydrofluoric acid to form highly insoluble calcium fluoride, which can lead to damage of the subterranean formation. Other metal ions liberated when acidizing carbonate materials of mixed mineralogy can also be problematic in this regard.

Another approach that can be used to address the presence of metal ions in a subterranean formation is to employ chelating agents that effectively sequester any problematic metal ions in a metal-ligand complex once the metal ions have been liberated from their source. As used herein, the terms "complex," "complexing," "complexation" and other variants thereof refer to the formation of a metal-ligand bond without reference to the mode of bonding. Although complexation of a metal ion may involve a chelation process in some embodiments, complexation is not deemed to be limited in this manner. Once bound in a metal-ligand complex, the metal ions may be substantially unable to undergo a further reaction to form damaging metal-containing precipitates. Although precipitation can be a particular concern when acidizing a siliceous material, chelating agents may also be used with similar benefits in conjunction with acidizing subterranean formations that comprise substantially only a carbonate material. In addition, chelating agents may also be used to directly dissolve a carbonate material, even in the absence of another acid. After complexing a metal ion with the chelating agent, the resultant metal-ligand complex may be produced from the subterranean formation during a cleanout operation, thereby precluding a subsequent reaction of the metal ions in the subterranean formation to form problematic insoluble compounds. Typically, such cleanout operations are conducted using aqueous cleanout fluids after generation of the metal-ligand complex is complete. However, cleanout operations can introduce significant delays in producing a hydrocarbon resource from the subterranean formation, not to mention increased production costs.

BRIEF DESCRIPTION OF THE DRAWING

The following FIGURE is included to illustrate certain aspects of the present disclosure, and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows an illustrative schematic of a system that can deliver treatment fluids of the present disclosure to a downhole location.

DETAILED DESCRIPTION

The present disclosure generally relates to stimulation of subterranean formations, and, more specifically, to methods for complexing metal ions in a subterranean formation with a hydrophobically modified chelating agent to decrease the occurrence of precipitation in the subterranean formation.

One or more illustrative embodiments incorporating the disclosure herein are presented below. Not all features of an actual implementation are described or shown in this application for the sake of clarity. It is to be understood that in the development of an actual embodiment incorporating the present disclosure, numerous implementation-specific decisions must be made to achieve the developer's goals, such as compliance with system-related, business-related, government-related and other constraints, which vary by implementation and from time-to-time. While a developer's efforts might be complex and time-consuming, such efforts would be, nevertheless, a routine undertaking for one having ordinary skill in the art and the benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claim, each numerical parameter should at least be construed in light of the number of reported significant digits and by applying ordinary rounding techniques.

Treatment operations to date have most typically utilized relatively hydrophilic chelating agents, such that the metal-ligand complexes formed therefrom remain substantially hydrophilic and exhibit significant miscibility in aqueous fluid phases. In many instances, an aqueous cleanout fluid may be utilized after generating the metal-ligand complexes to affect their removal from the subterranean formation via a cleanout operation. As used herein, the term "cleanout operation" refers to a process in which an unwanted material is removed from a subterranean formation following a treatment operation by introduction of another fluid thereto. Such aqueous cleanout operations can add to the time and expense needed to conduct a treatment operation employing a chelating agent. Moreover, the use of aqueous cleanout fluids can be further problematic in other regards, as discussed further hereinbelow.

The present inventors recognized that by altering the solubility properties of a metal-ligand complex formed from a chelating agent, significant benefits may be realized in the course of conducting a treatment operation. More particularly, the inventors recognized that by making a relatively hydrophobic metal-ligand complex from a hydrophobically modified chelating agent, significant benefits may be realized during various stimulation operations. Some of these advantages will now be discussed.

Foremost, by forming a relatively hydrophobic metal-ligand complex, production of the complex from the subterranean formation may take place in an oleaginous fluid rather than in an aqueous fluid. As used herein, the terms "produce," "producing," "production" and other variants thereof refers to the removal of a fluid from a subterranean formation. As used herein, the term "oleaginous" refers to a non-polar substance, having the properties of an oil or a like hydrocarbon compound. Specifically, in some embodiments, production of a relatively hydrophobic metal-ligand complex may take place concurrently with a hydrocarbon resource that may be present in the subterranean formation. In some embodiments, production of the metal-ligand complex with the hydrocarbon resource may desirably avoid having to perform an aqueous cleanout operation prior to production. It is not believed that the presence of the metal-ligand complex in the produced hydrocarbon resource will significantly impact its subsequent refining to produce gasoline and other refined hydrocarbon products. Thus, by utilizing a relatively hydrophobic chelating agent, stimulation and refining operations may be conducted at significantly reduced costs. In alternative embodiments, a separate cleanout operation may be conducted using an oleaginous fluid if co-production of the metal-ligand complex with a hydrocarbon resource is not desired. Cleanout operations using an oleaginous fluid may also change the wetting properties of the subterranean formation, which may be desirable in some cases, as discussed further below.

A further advantage of employing relatively hydrophobic chelating agents during a stimulation operation is that the chelating agent and/or a metal-ligand complex formed therefrom may interact with the subterranean formation to change the formation's wetting properties. That is, the presence of the chelating agent and/or its metal complex may result in a surface in subterranean formation becoming more "oil-wet" as opposed to "water-wet." Changing the wetting properties of a subterranean formation in this manner may increase production of a hydrocarbon resource therefrom. Moreover, by making a surface in a subterranean formation more "oil-wet" from the outset during metal complexation, one may be able to avoid a separate operation to change the wetting state of the subterranean formation from "water-wet" to "oil-wet." Again, significant cost savings can be realized as a result.

Although chelating agents that are relatively hydrophobic in nature may be utilized to practice the various embodiments described herein, it is believed in most instances to still be possible to introduce the chelating agents to a subterranean formation using a treatment fluid that remains predominantly aqueous in nature. After forming a metal-ligand complex, the initial hydrophobicity may increase further so that the above benefits are realized. Various surfactants, co-solvents and the like may be used to enhance dispersion of a hydrophobically modified chelating agent in a treatment fluid that remains predominantly aqueous in nature. By utilizing a predominantly aqueous treatment fluid to deliver the chelating agent, a more favorable environmental profile may be realized compared to an oleaginous treatment fluid for delivery of the chelating agent downhole. It is to be recognized, however, that an oleaginous treatment fluid may be utilized for subterranean delivery of the chelating agent in alternative embodiments of the present disclosure. For example, a treatment fluid that is predominantly oleaginous in nature may provide for better wetting characteristic of a surface within the subterranean formation, much like that which can occur with the oleaginous cleanout fluids referenced above. Moreover, an oleaginous treatment fluid may be particularly desirable in locales where sourcing and/or delivery of an aqueous fluid is problematic.

Particularly desirable chelating agents for practicing the embodiments described herein may include various hydrophobically modified aminopolycarboxylic acids. In various embodiments, such hydrophobically modified chelating agents may comprise a hydrophobic N-substitution that has about 6 carbon atoms or more, and often about 10 carbon atoms or more. The nature of the N-substitution may be tailored to adjust the hydrophobicity of the chelating agent and its resultant metal-ligand complex to some degree. The N-substitution may contain carbon and hydrogen only, or various types of heteroatom substitutions may optionally be present. In some embodiments, relatively hydrophobic N-substitutions such as unmodified alkyl or aryl groups may comprise the N-substitution. In other embodiments, the N-substitution may comprise a fatty acid amide derivative of the amino nitrogen. As used herein, the term "fatty acid" refers to a carboxylic acid compound having about 6 carbon atoms or more that lacks other heteroatoms. In other embodiments, alkyl groups, aryl groups, or amides bound to the amino nitrogen may be modified with a heteroatom substitution such as an alcohol, ether, carbonyl, amine, or the like, which can decrease the hydrophobic character of the chelating agent to some degree. In general, carboxylic acids are not believed to be suitable for use in the N-substitution due to their strongly hydrophilic nature. A number of hydrophobically modified aminopolycarboxylic acid chelating agents meeting the above description are available from commercial sources, or if not commercially available, they may be readily synthesized by routine methodology known to one having ordinary skill in the art.

In addition to their ready availability and facile synthetic modification at the amino nitrogen atom, some aminopolycarboxylic acids can be considered to be biodegradable. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. It is believed that at least some degree of biodegradability may be maintained for aminopolycarboxylic acids having the hydrophobic modifications described above. The biodegradability of these chelating agents may be further advantageous in regard to the environmental favorability of treatment operations conducted with these compounds.

As a still further advantage, the hydrophobically modified chelating agents described herein may form a variety of structures in a subterranean formation, some of which are believed to provide a macrostructure that may allow further tailoring of a treatment operation to take place. Although simple chelates of a single metal ion complexed by 1 to 4 molecules of the chelating agent may be formed in many instances, in other embodiments, polymeric metal complexes containing more than one metal ion may be formed. For example, in some embodiments, instead of complexing a single metal ion, the ligand substituents normally used to form a chelate ring with a single metal ion may instead separately complex two metal ions, leading to the formation of a polymeric metal complex with metal ion bridges between adjacent chelating agent molecules. The formation of polymeric metal complexes may result in more complex macrostructures, also referred to as complexes having long-range order herein. Illustrative macrostructures that may be formed from a polymeric metal complex include, for example, sheets, tubes, and/or reverse micelles. Further description in this regard follows below. In some embodiments, the formation of such macrostructures may result in gelation of the treatment fluid without the inclusion of an external gelling agent. Thus, in some embodiments, treatment fluids comprising a hydrophobically modified chelating agent may have diverting properties or other fluid loss control properties in addition to their benefits described above. Such macrostructures may also be even more hydrophobic than their simple chelate counterparts.

As used herein, the terms "formation" or "subterranean formation" refer to a body or section of geologic strata, structure, formation or other subsurface solid or collected material that is sufficiently distinctive and continuous with respect to other geologic strata or characteristics that it can be mapped, for example, by seismic techniques. A formation can be a body of geologic strata of predominantly one type or a combination of types, or a fraction of strata having a substantially common set of characteristics. A formation can contain one or more hydrocarbon-bearing zones. The terms "formation," "subterranean formation, "hydrocarbon-bearing subterranean formation," "reservoir," and "interval" may be used interchangeably with one another herein, but may generally be used to denote progressively smaller subsurface regions, zones, or volumes. More specifically, a geologic formation may generally be the largest subsurface region, a subterranean formation may generally be a region within the geologic formation and may generally be a hydrocarbon-bearing zone, and an interval may generally refer to a sub-region or portion of a reservoir. A hydrocarbon-bearing zone can be separated from other hydrocarbon-bearing zones by zones of lower permeability such as mudstones, shales, or shale-like (highly compacted) sands. In one or more embodiments, a hydrocarbon-bearing zone may include heavy oil in addition to sand, clay, or other porous solids.

As used herein, the term "hydrocarbons" generally refers to molecules formed primarily from carbon and hydrogen atoms, such as oil and natural gas. In some embodiments, hydrocarbons may be substituted with other elements such as, for example, halogens, metallic elements, nitrogen, oxygen, and/or sulfur. In other embodiments, they may be unsubstituted and contain only carbon and hydrogen. Hydrocarbons may be produced from subterranean formations through wells penetrating a hydrocarbon-containing formation. Hydrocarbons derived from a hydrocarbon-bearing subterranean formation may include, but are not limited to, kerogen, bitumen, pyrobitumen, asphaltic or tar oil, crude oils, natural gases, and any combination thereof. Hydrocarbons may be located within or adjacent to mineral matrices within the earth. Mineral matrices may include, but are not limited to, sedimentary rock, sands, silicilytes, carbonates, diatomites, and other porous media.

In various embodiments, treatment fluids containing a hydrophobically modified aminopolycarboxylic acid chelating agent and methods for use thereof are described herein. As used herein, the term "aminopolycarboxylic acid" refers to a compound having one or more amino groups and two or more carboxylic acid groups, where the one or more amino groups have an open valence for substitution with a hydrophobic substituent. In some embodiments, the treatment fluids described herein can comprise a hydrophobically modified aminopolycarboxylic acid chelating agent that comprises an N-substitution having no carboxylic acid groups and about 6 carbon atoms or more. Further disclosure regarding suitable hydrophobically modified aminopolycarboxylic acids follows hereinbelow.

In some embodiments, the treatment fluids described herein may comprise an aqueous carrier fluid as their continuous phase. Suitable aqueous carrier fluids may include, for example, fresh water, acidified water, salt water, seawater, brine (e.g., a saturated salt solution), or an aqueous salt solution (e.g., a non-saturated salt solution). Aqueous carrier fluids may be obtained from any suitable source. Given the benefit of the present disclosure, one of ordinary skill in the art will be able to determine a suitable aqueous carrier fluid for utilization in the embodiments described herein.

In some embodiments, an organic co-solvent may be included with an aqueous carrier fluid containing a hydrophobically modified aminopolycarboxylic acid chelating agent. Suitable organic co-solvents may include, but are not limited to, glycols and alcohol solvents, for example. When present, the amount of the organic co-solvent may range between about 1% to about 50% by volume of the treatment fluid. Considerations for including an organic co-solvent may include, for example, the solubility of the hydrophobically modified aminopolycarboxylic acid chelating agent that needs to be distributed in the treatment fluid.

In other various embodiments, the treatment fluids described herein may comprise an oleaginous carrier fluid as their continuous phase. Suitable oleaginous carrier fluids may include, for example, an organic solvent, a hydrocarbon, oil, a refined component of oil, or any combination thereof. Oleaginous carrier fluids may be utilized when the hydrophobically modified aminopolycarboxylic acid chelating agent is not sufficiently soluble in an aqueous treatment fluid.

In some embodiments, the treatment fluids described herein may further comprise a surfactant that increases the miscibility of the hydrophobically modified aminopolycarboxylic acid with the carrier fluid. Suitable surfactants are not believed to be particularly limited and may comprise cationic, anionic, zwitterionic, and/or neutral surfactants. When present, an amount of the surfactant in the treatment fluid may be less than about 10% by weight of the treatment fluid, with a typical range of between about 0.5% to about 5% by weight of the treatment fluid being used.

In some embodiments, the treatment fluids described herein can be acid-free other than the carboxylic acid groups that are present on the hydrophobically modified aminopolycarboxylic acid chelating agent. When no additional acids are present, the chelating agent may interact directly with a surface containing metal ions to affect its dissolution, such as a carbonate material in a subterranean formation.

In other embodiments, the treatment fluids described herein may further comprise another acid in addition to the carboxylic acid groups present on the hydrophobically modified aminopolycarboxylic acid chelating agent. Inclusion of an acid in the treatment fluids may result in a more vigorous dissolution of a surface containing a metal ion (e.g., in a subterranean formation) than is possible with dissolution that is only promoted by a chelating agent. For example, in some embodiments, dissolution of a carbonate material may be promoted by reaction with an acid, and metal ions liberated from the carbonate material may undergo a subsequent reaction with the chelating agent to affect their sequestration. In some embodiments, a chelating agent that is co-present with an acid may also promote direct dissolution of a carbonate material, as described in reference to the acid-free embodiments above.

When an acid is present, the treatment fluids may comprise a mineral acid or an organic acid. Suitable mineral acids may include, but are not limited to, hydrochloric acid and hydrobromic acid. Hydrofluoric acid is not generally used as a mineral acid for promoting dissolution of carbonate materials, but it may be present if the treatment fluid is being used to treat a siliceous formation. Suitable organic acids may include, but are not limited to, formic acid, acetic acid, methanesulfonic acid, chloroacetic acid, dichloroacetic acid, trichloroacetic acid, fluoroacetic acid, difluoroacetic acid, trifluoroacetic acid, and any combination thereof. Acid-generating compounds may also be used in the treatment fluids in a comparable manner. Examples of suitable acid-generating compounds that may be used in some embodiments described herein include, for example, esters, aliphatic polyesters, orthoesters, poly(orthoesters), poly(lactides), poly(glycolides), poly($\epsilon$-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol.

Depending on whether an acid is present in combination with the chelating agent, and the concentration of each, the treatment fluids described herein can exhibit a wide range of initial pH values. In various embodiments, the treatment fluids described herein can have an initial pH value of about 4 or lower, or about 3.5 or lower, or about 3 or lower, or about 2.5 or lower, or about 2 or lower, or about 1.5 or lower, or about 1 or lower. In some embodiments, the initial pH of the treatment fluids may range between about 0 and about 4, or between about 1 and about 4, or between about 1 and about 3, or between about 2 and about 4. Factors that may be taken into account in determining a suitable pH for a particular treatment fluid include, for example, the composition of a surface being treated and the desired dissolution rate.

In some embodiments, the treatment fluids described herein may have a pH that is initially below the pKa values of the carboxylic acid groups comprising the aminopolycarboxylic acid chelating agent. At such pH values, the chelating agent may be initially inactive for complexing a metal ion. However, as described in commonly owned U.S. patent application Ser. No. 13/925,888, filed on Jun. 25, 2013 and incorporated herein by reference in its entirety, certain advantages can be realized by formulating a treatment fluid with an initially inactive chelating agent, not the least of which is tempering the initial reaction rate of the treatment fluid with a surface comprising a carbonate material. The decreased reaction rate may promote the generation of wormholes in the carbonate material, rather than the bulk erosion that can occur at more rapid reaction rates. As the treatment fluid becomes at least partially spent and the pH of the treatment fluid rises, the chelating agent may once again become active for complexing a metal ion as its carboxylic acid groups become deprotonated, thereby allowing the chelating agent to serve dual effects in a treatment operation. The pH below which the chelating agent may become inactive for complexing a metal ion may be dictated to some degree by the structure of the chelating agent. Further tailoring of the effective pH for complexing a metal ion may also take place through modification of the hydrophobic N-substitution on the aminopolycarboxylic acid chelating agent.

In other various embodiments, the treatment fluids described herein can have a pH that is initially above the pKa values of the carboxylic acid groups comprising the aminopolycarboxylic acid chelating agent. In such embodiments, the chelating agent may be active for complexing a metal ion from the outset when contacting a surface with the treatment fluid to affect its dissolution.

When the treatment fluids comprise a mineral acid such as hydrochloric acid, for example, the acid may be initially present in the treatment fluids in an amount ranging between about 1% to about 10% of the treatment fluid by weight, or in an amount ranging between about 5% to about 10% of the treatment fluid by weight. Since organic acids are generally less acidic than are mineral acids, when the treatment fluids comprise an organic acid, the organic acid may comprise up to about 20% of the treatment fluid by weight, particularly between about 1% to about 20% of the treatment fluid by weight, or between about 10% to about 20% of the treatment fluid by weight.

In general, a concentration of the hydrophobically modified aminopolycarboxylic acid chelating agent in the treatment fluids described herein may be dictated by the quantity of metal ions needing sequestration in the course of conducting a particular treatment operation. In various embodiments, a concentration of the chelating agent in the treatment fluid may range between about 0.1% to about 20% by weight of the treatment fluid. In more particular embodiments, a concentration of the chelating agent in the treatment fluid may range between about 1% to about 15% by weight of the treatment fluid, or between about 1% to about 5% by weight of the treatment fluid, or between about 1% to about 10% by weight of the treatment fluid, or between about 5% to about 10% by weight of the treatment fluid, or between about 5% to about 15% by weight of the treatment fluid.

As described above, the N-substitution that conveys enhanced hydrophobicity to the aminopolycarboxylic acid chelating agent may be tailored to control the extent of the hydrophobicity increase. One way in which the hydrophobicity may be changed is by varying the number of carbon atoms that are present in the N-substitution. In some embodiments, the N-substitution may comprise about 6 to about 30 carbon atoms. In more particular embodiments, the N-substitution may comprise about 6 to about 24 carbon atoms, or about 8 to about 20 carbon atoms, or about 6 to about 18 carbon atoms, or about 10 to about 18 carbon atoms, or about 12 to about 18 carbon atoms.

In some embodiments, the N-substitution may comprise an N-alkyl or an N-aryl group having about 6 to about 18 carbon atoms. In other embodiments, the N-substitution may comprise an N-alkyl or an N-aryl group having about 8 to about 18 carbon atoms, or about 10 to about 18 carbon atoms. In some embodiments, the N-alkyl or N-aryl group may be unsubstituted, such that it contains only carbon and hydrogen. In other embodiments, the N-alkyl or N-aryl group may be substituted with heteroatom functionalities such as oxygen and/or nitrogen. Oxygen functionalities may be present in the form of alcohols, carbonyl groups, ethers, esters, and the like. Nitrogen functionalities may be present in the form of amines, amides, azo groups, nitro groups, and the like.

In some embodiments, the N-substitution may comprise an unsubstituted N-alkyl group having about 10 to about 18 carbon atoms. The alkyl group may be branched or straight chain.

In some embodiments, the N-substitution may comprise a fatty acid amide derivative of the amino group in the aminopolycarboxylic acid. Suitable fatty acids amides may include, for example, amides of caproic acid, caprylic acid, capric acid, lauric acid, myristic acid, palmitic acid, stearic acid, and arachidic acid.

In some embodiments, the aminopolycarboxylic acid being hydrophobically modified with an N-substitution having about 6 carbon atoms or more may be an iminodiacetic acid (IDA) compound. IDA may be advantageous for practicing the embodiments described herein, since unsubstituted IDA is biodegradable, and the biodegradability properties may be retained, at least in part, in an N-substituted IDA compound. Other biodegradable aminopolycarboxylic acids that may be hydrophobically modified with a hydrophobic N-substitution in a related manner include, for example, ethylenediaminedisuccinic acid, S,S-ethylenediaminedisuccinic acid (EDDS), iminodisuccinic acid (IDS), hydroxyiminodisuccinic acid (HIDS), and polyamino disuccinic acids.

In some embodiments, the hydrophobically modified aminopolycarboxylic acid chelating agent may comprise an iminodiacetic acid compound. Hydrophobically modified iminodiacetic acid compounds may have the structure set forth in Formula 1 below, where R is a hydrophobic moiety having no carboxylic acid groups and about 6 carbon atoms or more. In some embodiments, R may comprise a substituted or unsubstituted alkyl or aryl group, as defined above. Related structures can be envisioned for the other aminopolycarboxylic acids named above, each having an initially unsubstituted amino group.

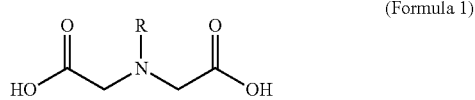
(Formula 1)

Without being bound by any theory or mechanism, it is believed that a number of structures may be formed when hydrophobically modified aminopolycarboxylic acids complex a metal ion. In some embodiments, simple 4- or 6-coordinate chelate complexes may be formed, such as those depicted in Formulas 2 and 3 below. In other embodiments, polymeric metal complexes which contain more than one metal ion may be formed. Illustrative structures of such polymeric metal complexes are depicted in Formulas 4 and 5 below, where n is the number of polymer repeating units. Combinations of the various metal ion coordination motifs depicted in the polymer repeating units of Formulas 4 and 5 may occur in a particular polymeric metal complex. In some embodiments, the metal ions may be chelated by one hydrophobically modified chelating agent molecule and coordinated by two or more other hydrophobically modified chelating agent molecules without chelation occurring, as depicted in Formula 4. In other embodiments, the metal ions may be complexed, but not chelated at all, as depicted in Formula 5.

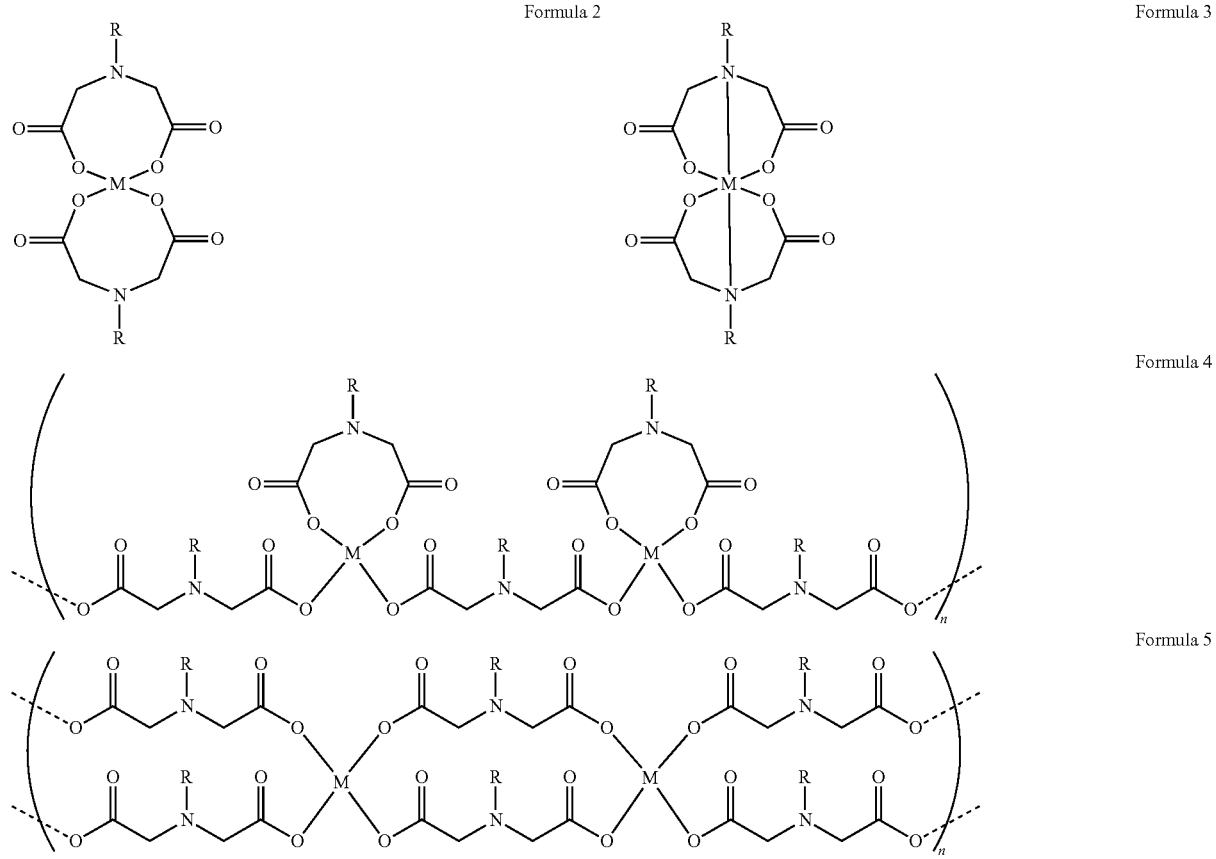

Formula 2

Formula 3

Formula 4

Formula 5

As discussed above, even when an aminopolycarboxylic acid is hydrophobically modified, it may remain soluble in an aqueous fluid. However, when a hydrophobically modified aminopolycarboxylic acid is coordinated to a metal ion, such as in Formulas 2 and 3, the hydrophobicity may increase, such that the metal-ligand complex formed from the aminopolycarboxylic acid is no longer soluble in water and is instead soluble in an oleaginous fluid. The illustrative polymeric metal complexes depicted in Formulas 4 and 5 can be even more hydrophobic than are the simple chelate complexes of Formulas 2 and 3. In some embodiments, formation of polymeric metal complexes, such as those depicted in Formulas 4 and 5, may result in gelation of the treatment fluid. In some embodiments, macrostructures having longer range order may form in the treatment fluid when polymeric metal complexes are present, such as those depicted in Formulas 4 and 5. For example, in some embodiments, long-range ordering of polymeric metal complexes in the treatment fluid may form structures such as, for example, sheets, tubes, or reverse micelles in the treatment fluid. Such long-range ordering of the polymeric metal complexes may result from association of the hydrophobic modifications with one another to form defined regions having a high hydrophobic character. For example, in a reverse micelle the hydrophobic modifications may agglomerate at the interior of the micelle and also on its exterior surface, with a region of coordinated metal ions disposed between the two in a highly hydrophilic region. Similarly, sheets may be formed by association of the hydrophobic modifications with one another to create long-range ordering. Likewise, tubes may be formed from a sheet that folds in upon itself.

In additional embodiments, the treatment fluids described herein may further comprise any number of additives that are commonly used in downhole operations including, for example, silica scale control additives, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of these additives can be used as well. Given the benefit of the present disclosure, one of ordinary skill in the art will be able to formulate a treatment fluid having properties suitable for a given application.

In some embodiments, the treatment fluids described herein can be utilized in matrix dissolution operations. That is, in some embodiments, the treatment fluids described herein can be introduced to a subterranean formation below a fracture gradient pressure of the subterranean formation. In such embodiments, the interaction of the treatment fluid with the formation matrix may result in the desirable formation of wormholes therein. In other embodiments, the treatment fluids described herein can be introduced to a subterranean formation at or above a fracture gradient pressure of the subterranean formation, such that one or more fractures are created or enhanced in the subterranean formation. Given the benefit of the present disclosure and the understanding of one having ordinary skill in the art, one can readily determine whether to introduce the treatment fluids to a subterranean formation at matrix flow rates (i.e., below the fracture gradient pressure) or at fracturing flow rates (i.e., at or above the fracture gradient pressure).

As used herein, the term "fracture gradient pressure" refers to an equivalent fluid pressure sufficient to create or enhance one or more fractures in the subterranean formation. As used herein, the "fracture gradient pressure" of a layered formation also encompasses a parting fluid pressure sufficient to separate one or more adjacent bedding planes in a layered formation. It should be understood that one of ordinary skill in the art may perform a simple leak-off test on a core sample of a formation to determine the fracture gradient pressure of a particular formation.

As used herein, the term "fracture" refers to a crack, delamination, surface breakage, separation, crushing, rubblization, or other destruction within a geologic formation or fraction of formation not related to foliation or cleavage in metamorphic formation, along which there has been displacement or movement relative to an adjacent portion of the formation. A fracture along which there has been lateral displacement may be termed a fault. When walls of a fracture have moved only normal to each other, the fracture may be termed a joint. Fractures may enhance permeability of rocks greatly by connecting pores together, and for that reason, joints and faults may be induced mechanically in some reservoirs in order to increase fluid flow.

In some embodiments, methods described herein may comprise providing a treatment fluid comprising a hydrophobically modified aminopolycarboxylic acid chelating agent, the chelating agent comprising an N-substitution having no carboxylic acid groups and about 6 carbon atoms or more; introducing the treatment fluid into a subterranean formation; and complexing metal ions in the subterranean formation with the chelating agent to form a metal-ligand complex.

In various embodiments, the subterranean formation may comprise a carbonate material. The carbonate material may occur natively in the subterranean formation, or it can have been introduced to the subterranean formation in the course of performing a treatment operation. In some embodiments, the subterranean formation can comprise primarily a carbonate material such as calcite, dolomite, or siderite. In some embodiments, the subterranean formation may comprise a carbonate formation such as, for example, a chalk formation or a limestone formation. In other embodiments, the subterranean formation may comprise a mixed mineralogy, such as a mixture of a siliceous material and a carbonate material. For example, in some embodiments, the treatment fluids described herein may be used to treat a siliceous formation that also contains a carbonate material therein, before acidizing of the siliceous material takes place.

In various embodiments, the methods may further comprise dissolving a carbonate material in the subterranean formation. In such embodiments, at least a portion of the metal ions being complexed in the subterranean formation may arise from dissolution of the carbonate material. That is, in some embodiments, the metal ions may be generated in the subterranean formation from the carbonate material. Illustrative metal ions that may result from dissolution of a carbonate material include, for example, calcium ions, magnesium ions, iron ions, and any combination thereof. Dissolution of the carbonate material may take place through the action of an acid that may be present in the treatment fluid, or the chelating agent may interact directly with the carbonate material without the influence of an acid to affect dissolution. Combinations of these dissolution processes are also possible. Other sources of metal ions in the subterranean formation are also possible, and complexation of problematic metal ions from these alternative sources are also contemplated by the embodiments described herein. For example, metal ions resulting from corrosion can also be complexed according to the embodiments described herein.

In some embodiments, the methods may further comprise producing the metal-ligand complex from the subterranean formation. Production of the metal-ligand complex may allow the metal ions to be removed from the subterranean formation before they are able to produce further deleterious effects. For example, in some embodiments, removal of metal ions from the subterranean formation may prevent scaling by a reaction product of the metal ions. In other embodiments, the metal ions may be produced from the subterranean formation before a subsequent treatment operation is performed. For example, in some embodiments, a carbonate material may be removed from a subterranean formation that also contains a siliceous material, before the siliceous material is dissolved using hydrofluoric acid or a hydrofluoric acid-generating compound, thereby decreasing the likelihood of precipitation occurring in the presence of hydrofluoric acid.

In some embodiments, the metal-ligand complex may be soluble in water, and the metal-ligand complex may be produced from the subterranean formation in an aqueous cleanout fluid that may be introduced to the subterranean formation subsequent to the treatment fluid containing the chelating agent. More desirably, however, in some embodiments, the metal-ligand complex may be insoluble in water, and the metal-ligand complex may be produced from the subterranean formation in an oleaginous fluid, such as a hydrocarbon fluid. In some embodiments, a hydrocarbon fluid in which the metal-ligand complex is produced may comprise an oleaginous cleanout fluid introduced to the subterranean formation subsequent to the treatment fluid containing the chelating agent. In other embodiments, a hydrocarbon fluid in which the metal-ligand complex is produced may comprise a hydrocarbon resource that is present in the subterranean formation. In the latter embodiments, the metal-ligand complex may be produced from the subterranean formation without performing a cleanout operation, particularly with an aqueous cleanout fluid. The opportunity to omit a cleanout operation represents a particular advantage of the methods described herein.

In some embodiments, methods described herein may comprise: providing a treatment fluid comprising a hydrophobically modified aminopolycarboxylic acid chelating agent, the chelating agent comprising an N-substitution having no carboxylic acid groups and about 6 carbon atoms or more; introducing the treatment fluid into a subterranean formation comprising a carbonate material; generating metal ions in the subterranean formation from the carbonate material; forming a metal-ligand complex in the subterranean formation from at least a portion of the metal ions and the chelating agent; and producing at least a portion of the metal-ligand complex from the subterranean formation. In some embodiments, the metal-ligand complex may be produced from the subterranean formation in a hydrocarbon fluid, which may comprise a hydrocarbon resource that is present in the subterranean formation.

In some embodiments, the treatment fluids and methods described herein can be utilized in matrix acidizing operations. That is, in some embodiments, the treatment fluids described herein can be introduced to a subterranean formation below a fracture gradient pressure of the subterranean formation. In such embodiments, the interaction of the treatment fluid with the formation matrix may result in the desirable formation of wormholes therein. Bulk erosion may occur in some embodiments. In other embodiments, the treatment fluids described herein can be introduced to a subterranean formation at or above a fracture gradient pressure of the subterranean formation, such that one or more fractures are created or enhanced in the subterranean formation as a result of the treatment. Given the benefit of the present disclosure and the understanding of one having ordinary skill in the art, one can readily determine whether to introduce the treatment fluids to a subterranean formation at matrix flow rates (i.e., below the fracture gradient pressure) or at fracturing flow rates (i.e., at or above the fracture gradient pressure).

In other various embodiments, systems configured for delivering the treatment fluids described herein to a downhole location are described. In various embodiments, the systems can comprise a pump fluidly coupled to a tubular, the tubular containing a treatment fluid comprising a hydrophobically modified aminopolycarboxylic acid chelating agent, the chelating agent comprising an N-substitution having no carboxylic acid groups and about 6 carbon atoms or more.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the fluid to enter into the subterranean formation. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from the subterranean formation.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

In various embodiments, the treatment fluids described herein may be used in conjunction with a stimulation operation conducted in a subterranean formation. The treatment fluids may be delivered downhole using the illustrative systems described hereinabove. In some embodiments, the stimulation operation can comprise a fracturing operation. In some or other embodiments, the stimulation operation can comprise an acidizing operation. In some embodiments, the treatment fluids described herein may be used in conjunction with a remediation operation conducted in a subterranean formation. Each of the foregoing treatment operations is discussed in more detail hereinbelow.

In some embodiments, the treatment fluids described herein may be used to treat a proppant pack or a gravel pack in a subterranean formation in order to increase its permeability. In some embodiments, the treatment fluids may be used to treat an existing fracture in a subterranean formation in order to enhance a flow pathway therein. In some embodiments, the treatment fluids may be used in the course of creating or extending a fracture in a subterranean formation by introducing the treatment fluid at or above a fracture gradient pressure of the subterranean formation.

In some embodiments, the treatment fluids may be used to remediate a subterranean formation that has precipitation or accumulation damage therein. As used herein, the term "precipitation or accumulation damage" refers to a material that has been dissolved in a subterranean formation and deposited elsewhere within the subterranean formation, optionally after undergoing a further reaction. That is, the treatment fluids described herein may be used to dissolve the various components of such damage in order to increase the permeability of the subterranean formation, thereby leading to the possibility of increased production. The precipitation or accumulation damage in the subterranean formation may result from any source, which may include another stimulation operation.

In some embodiments, the treatment fluids described herein may be used in conjunction with drilling a wellbore penetrating a subterranean formation. For example, when used during drilling, the treatment fluids may desirably leave the subterranean formation conditioned with chelating agent so that precipitation can be subsequently mitigated at a later time. It is to be recognized, however, that the treatment fluids may also be used for proactive treatment of a subterranean formation at points in time other than in the drilling stage.

Embodiments disclosed herein include:

A. Methods for Treating a Subterranean Formation.

The methods comprise: providing a treatment fluid comprising a hydrophobically modified aminopolycarboxylic acid chelating agent, the chelating agent comprising an N-substitution having no carboxylic acid groups and about 6 carbon atoms or more; introducing the treatment fluid into a subterranean formation; and complexing metal ions in the subterranean formation with the chelating agent to form a metal-ligand complex.

B. Methods for Treating a Subterranean Formation.

The methods comprise: providing a treatment fluid comprising a hydrophobically modified aminopolycarboxylic acid chelating agent, the chelating agent comprising an N-substitution having no carboxylic acid groups and about 6 carbon atoms or more; introducing the treatment fluid into a subterranean formation comprising a carbonate material; generating metal ions in the subterranean formation from the carbonate material; forming a metal-ligand complex in the subterranean formation from at least a portion of the metal ions and the chelating agent; and producing at least a portion of the metal-ligand complex from the subterranean formation.

C. Systems for Delivering a Treatment Fluid to a Subterranean Formation.

The systems comprise a pump fluidly coupled to a tubular, the tubular containing a treatment fluid comprising a hydrophobically modified aminopolycarboxylic acid chelating agent, the chelating agent comprising an N-substitution having no carboxylic acid groups and about 6 carbon atoms or more.

Each of embodiments A, B, and C may have one or more of the following additional elements in any combination:

Element 1: wherein the method further comprises producing the metal-ligand complex from the subterranean formation.

Element 2: wherein the metal-ligand complex is produced from the subterranean formation in a hydrocarbon fluid.

Element 3: wherein the metal-ligand complex is produced from the subterranean formation without performing a cleanout operation.

Element 4: wherein the metal-ligand complex is insoluble in water.

Element 5: wherein the subterranean formation comprises a carbonate material.

Element 6: wherein the metal ions are generated in the subterranean formation from the carbonate material.

Element 7: wherein the N-substitution comprises an N-alkyl or N-aryl group having about 6 to about 18 carbon atoms.

Element 8: wherein the N-substitution comprises an unsubstituted N-alkyl group having about 10 to about 18 carbon atoms.

Element 9: wherein the metal-ligand complex comprises a polymeric metal complex containing more than one metal ion.

Element 10: wherein the hydrophobically modified aminopolycarboxylic acid chelating agent comprises an iminodiacetic acid compound.

Element 11: wherein the treatment fluid further comprises an acid.

Element 12: wherein the acid comprises a mineral acid or an organic acid selected from the group consisting of hydrochloric acid, hydrobromic acid, formic acid, acetic acid, methanesulfonic acid, chloroacetic acid, dichloroacetic acid, trichloroacetic acid, fluoroacetic acid, difluoroacetic acid, trifluoroacetic acid, and any combination thereof.

Element 13: wherein the treatment fluid has an initial pH ranging between about 0 and about 4.

Element 14: wherein the treatment fluid is introduced into the subterranean formation above a fracture gradient pressure of the subterranean formation.

Element 15: wherein the treatment fluid is introduced into the subterranean formation below a fracture gradient pressure of the subterranean formation.

By way of non-limiting example, exemplary combinations applicable to A, B, C include:

The method of A in combination with elements 1 and 3.
The method of A in combination with elements 2 and 5.
The method of A in combination with elements 7 and 10.
The method of A in combination with elements 10 and 11.
The method of A in combination with elements 5 and 13.
The method of B in combination with elements 2 and 6.
The method of B in combination with elements 3 and 7.
The method of B in combination with elements 7, 10 and 11.
The system of C in combination with elements 7 and 10.
The system of C in combination with elements 7 and 11.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained in a particular implementation of the present disclosure. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:
   providing a treatment fluid comprising a hydrophobically modified aminopolycarboxylic acid chelating agent, the chelating agent comprising an N-substitution having no carboxylic acid groups and the N-substitution having about 6 carbon atoms or more;
   introducing the treatment fluid into a subterranean formation; and
   complexing metal ions in the subterranean formation with the chelating agent to form a metal-ligand complex.

2. The method of claim 1, further comprising:
   producing the metal-ligand complex from the subterranean formation.

3. The method of claim 2, wherein the metal-ligand complex is produced from the subterranean formation in a hydrocarbon fluid.

4. The method of claim 2, wherein the metal-ligand complex is produced from the subterranean formation without performing a cleanout operation.

5. The method of claim 1, wherein the metal-ligand complex is insoluble in water.

6. The method of claim 1, wherein the subterranean formation comprises a carbonate material.

7. The method of claim 6, wherein the metal ions are generated in the subterranean formation from the carbonate material.

8. The method of claim 1, wherein the N-substitution comprises an N-alkyl or N-aryl group having about 6 to about 18 carbon atoms.

9. The method of claim 8, wherein the N-substitution comprises an unsubstituted N-alkyl group having about 10 to about 18 carbon atoms.

10. The method of claim 1, wherein the metal-ligand complex comprises a polymeric metal complex containing more than one metal ion.

11. The method of claim 1, wherein the hydrophobically modified aminopolycarboxylic acid chelating agent comprises an iminodiacetic acid compound.

12. The method of claim 1, wherein the treatment fluid further comprises an acid.

13. The method of claim 12, wherein the acid comprises a mineral acid or an organic acid selected from the group consisting of hydrochloric acid, hydrobromic acid, formic acid, acetic acid, methanesulfonic acid, chloroacetic acid, dichloroacetic acid, trichloroacetic acid, fluoroacetic acid, difluoroacetic acid, trifluoroacetic acid, and any combination thereof.

14. The method of claim 1, wherein the treatment fluid has an initial pH ranging between about 0 and about 4.

15. A method comprising:
   providing a treatment fluid comprising a hydrophobically modified aminopolycarboxylic acid chelating agent, the chelating agent comprising an N-substitution having no carboxylic acid groups and the N-substitution having about 6 carbon atoms or more;
   introducing the treatment fluid into a subterranean formation comprising a carbonate material;
   generating metal ions in the subterranean formation from the carbonate material;
   forming a metal-ligand complex in the subterranean formation from at least a portion of the metal ions and the chelating agent; and
   producing at least a portion of the metal-ligand complex from the subterranean formation.

16. The method of claim 15, wherein the treatment fluid has an initial pH ranging between about 0 and about 4.

17. The method of claim 15, wherein the metal-ligand complex is produced from the subterranean formation in a hydrocarbon fluid.

18. The method of claim 15, wherein the metal-ligand complex is produced from the subterranean formation without performing a cleanout operation.

19. The method of claim 15, wherein the N-substitution comprises an N-alkyl or N-aryl group having about 6 to about 18 carbon atoms.

20. The method of claim 19, wherein the N-substitution comprises an unsubstituted N-alkyl group having about 10 to about 18 carbon atoms.

21. The method of claim 15, wherein the treatment fluid further comprises a mineral acid or an organic acid.

22. The method of claim 15, wherein the treatment fluid is introduced into the subterranean formation above a fracture gradient pressure of the subterranean formation.

23. The method of claim 15, wherein the treatment fluid is introduced into the subterranean formation below a fracture gradient pressure of the subterranean formation.

24. A system comprising: a pump fluidly coupled to a tubular, the tubular disposed in a subterranean formation, the tubular containing a treatment fluid comprising a hydrophobically modified aminopolycarboxylic acid chelating agent, the chelating agent comprising an N-substitution having no carboxylic acid groups and the N-substitution having about 6 carbon atoms or more.

* * * * *